(12) United States Patent
Gao

(10) Patent No.: US 11,381,869 B2
(45) Date of Patent: Jul. 5, 2022

(54) TRANSMITTING METHOD, RECEIVING METHOD, TRANSMITTING DEVICE, AND RECEIVING DEVICE FOR AUDIO AND VIDEO DATA IN LONG-DISTANCE TRANSMISSION

(71) Applicant: SHENZHEN LENKENG TECHNOLOGY CO., LTD, Shenzhen (CN)

(72) Inventor: Binghai Gao, Shenzhen (CN)

(73) Assignee: SHENZHEN LENKENG TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/187,884

(22) Filed: Mar. 1, 2021

(65) Prior Publication Data

US 2021/0281910 A1    Sep. 9, 2021

(30) Foreign Application Priority Data

Mar. 4, 2020  (CN) .......................... 202010143588.1

(51) Int. Cl.
*H04N 21/4363*   (2011.01)
*H04L 25/02*     (2006.01)
*H04N 21/235*    (2011.01)
*H04N 21/6405*   (2011.01)

(52) U.S. Cl.
CPC ... *H04N 21/43635* (2013.01); *H04L 25/0272* (2013.01); *H04N 21/2353* (2013.01); *H04N 21/6405* (2013.01)

(58) Field of Classification Search
CPC ........ H04N 21/43635; H04N 21/6405; H04N 21/2353; H04L 25/0272
See application file for complete search history.

(56) References Cited

U.S. PATENT DOCUMENTS

| | | | |
|---|---|---|---|
| 9,602,785 B2* | 3/2017 | Choi | G09G 5/006 |
| 10,631,041 B1* | 4/2020 | Suzuki | G09G 5/006 |
| 2007/0052869 A1* | 3/2007 | Priest | G06F 13/4045 |
| | | | 348/735 |
| 2009/0102972 A1* | 4/2009 | Kurita | H04N 21/43637 |
| | | | 348/554 |
| 2010/0132001 A1* | 5/2010 | Kitano | H04N 21/44227 |
| | | | 725/118 |

(Continued)

*Primary Examiner* — Fernando Alcon

(57) ABSTRACT

Disclosed are a transmitting method, a receiving method, a transmitting device, and a receiving device for audio and video data in a long-distance transmission. The receiving method comprises the follows. A first protocol data stream is obtained by the receiving device via a second transmission medium interface. The first protocol data stream is processed by the receiving device to obtain a second preset protocol data stream and second preset audio and video data. The second preset protocol data stream is outputted by the receiving device via a third transmission medium interface. The second preset audio and video data is outputted by the receiving device via a second high definition multimedia interface (HDMI). By adopting the disclosure, the extended transmission of audio and video data can be realized, which can reduce the transmission cost and construction time. This shall result in higher user experience.

16 Claims, 2 Drawing Sheets

(56) References Cited

U.S. PATENT DOCUMENTS

| | | | |
|---|---|---|---|
| 2011/0164181 A1* | 7/2011 | Higuchi | H04N 21/43607 348/552 |
| 2012/0023267 A1* | 1/2012 | Sasaki | H04N 21/43635 710/14 |
| 2012/0242905 A1* | 9/2012 | Inoue | G09G 5/006 348/705 |
| 2013/0100244 A1* | 4/2013 | Suzuki | G09G 5/006 348/43 |
| 2014/0240604 A1* | 8/2014 | Toba | G09G 5/006 348/723 |
| 2015/0020088 A1* | 1/2015 | Velasco | H04N 21/4384 725/25 |
| 2017/0195722 A1* | 7/2017 | Seo | H04N 21/43635 |
| 2017/0311030 A1* | 10/2017 | Toba | H04N 19/103 |
| 2019/0132148 A1* | 5/2019 | Kambhatla | H04L 12/40071 |
| 2020/0014974 A1* | 1/2020 | Patel | H04N 21/42204 |
| 2020/0322054 A1* | 10/2020 | Bai | H04B 10/25 |
| 2020/0328915 A1* | 10/2020 | Kumar | H04L 1/243 |

\* cited by examiner

TRANSMITTING METHOD, RECEIVING METHOD, TRANSMITTING DEVICE, AND RECEIVING DEVICE FOR AUDIO AND VIDEO DATA IN LONG-DISTANCE TRANSMISSION

CROSS REFERENCE TO RELATED APPLICATION

The present application claims priority to Chinese Patent Application Serial No. 202010143588.1 on 4 Mar. 2020, the disclosure of which is herein by incorporated by reference.

TECHNICAL FIELD

The disclosure relates to the technical field of network communication, and particularly to a transmitting method, a receiving method, a transmitting device, and a receiving device for audio and video data in long-distance transmission.

BACKGROUND

With the advancement of society and the development of science and technology, especially the development of Internet of Things (IoT) technology, the Internet of Things of various traditional devices has become a trend. At present, most of the communication lines between traditional devices are relatively complicated, and the cost of wiring is relatively high.

SUMMARY

Based on the above problems and the shortcomings of the prior art, the disclosure provides a transmitting method, a receiving method, a transmitting device, and a receiving device for audio and video data in long-distance transmission to achieve extended transmission of audio and video data, which can reduce wiring costs and can reduce construction time. This shall result in higher user experience.

In a first aspect, a transmitting method for audio and video data in a long-distance transmission is provided. The method includes the following.

Audio and video data are obtained by a transmitting device via a first high definition multimedia interface (HDMI).

The audio and video data are processed by the transmitting device into a first protocol data stream.

The first protocol data stream is transmitted by the transmitting device via a first transmission medium interface.

In a second aspect, a receiving method for audio and video data in a long-distance transmission is provided. The method includes the following.

The first protocol data stream is obtained by a receiving device via a second transmission medium interface.

The first protocol data stream is processed by the receiving device to obtain a second preset protocol data stream and second preset audio and video data.

The second preset protocol data stream is outputted by the receiving device via a third transmission medium interface and the second preset audio and video data is outputted by the receiving device via a second high definition multimedia interface (HDMI).

In a third aspect, a transmitting device for audio and video data in a long-distance transmission is provided. The transmitting device includes a first memory and a first processor coupled to the first memory. Where a first memory is configured to store first application instructions, and a first processor is configured to invoke the first application instructions to process audio and video data via the first high definition multimedia interface (HDMI) into a first protocol data stream.

In a fourth aspect, a receiving device for audio and video data in a long-distance transmission is provided. Where the receiving device includes a second memory and a second processor coupled to the second memory. Where the second memory is configured to store second application instructions, and the second processor is configured to invoke the second application instructions to obtain a second preset protocol data stream, and second preset audio and video data. Where the second preset protocol data stream is outputted via a third transmission medium interface, and the second preset audio and video data is outputted via a second high definition multimedia interface (HDMI).

BRIEF DESCRIPTION OF THE DRAWINGS

In order to explain the technical solutions in implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative work.

DETAILED DESCRIPTION

The technical solutions in the disclosure will be described clearly and completely in combination with the accompanying drawings in the disclosure. Obviously, the described implementations are part of the implementations of the disclosure, but not all of the implementations.

Figure 1:
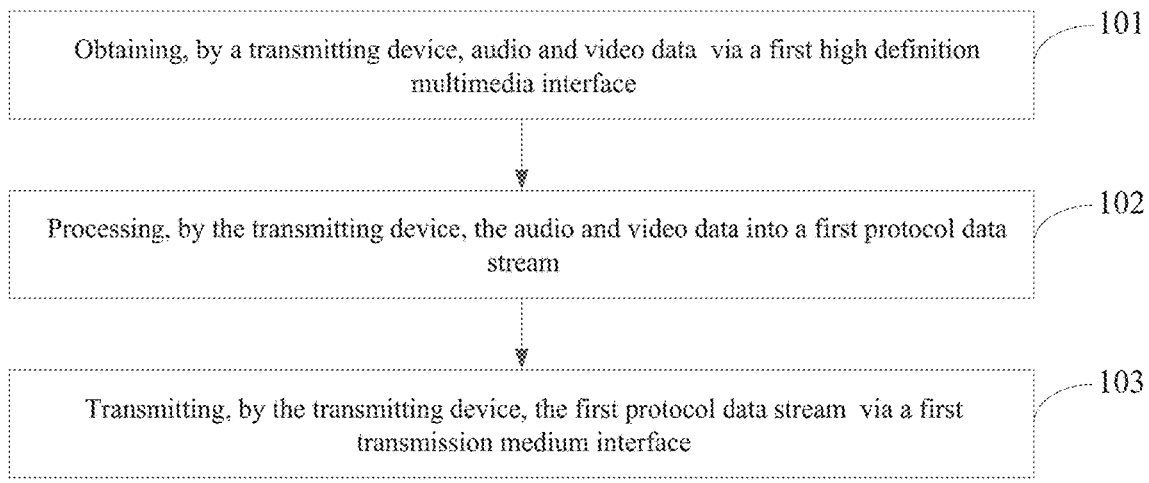
FIG. 1 is a schematic structural diagram of a transmitting method for audio and video data in the long-distance transmission according to the disclosure.

FIG. 1 is a schematic structural diagram of a transmitting method for audio and video data in the long-distance transmission according to the disclosure. As shown in FIG. 1, the transmitting method may include, but is not limited to, the following.

At block 101, the audio and video data are obtained by a transmitting device via a first high definition multimedia interface (HDMI).

Specifically, the audio and video data can be obtained by the transmitting device from a video source device (e.g., DVD, set-top box, camera, etc.) connected to the transmitting device via three transition minimized differential signal (TMDS) data channels of the first HDMI. Where the first HDMI may further include a clock channel.

The first HDMI may include, but is not limited to, a HDMI for the transmitting device to obtain the audio and video data from the video source device connected to the transmitting device.

The audio and video data may include, but is not limited to, sensory audio and video data such as text, data, sound, graphics, images, or video (e.g., HD video at 1080P, 4K, or 8K resolution with a frame rate of 60 FPS), etc. The audio and video data may also include, but is not limited to, the following features. The data format may be a YUV444 or YCbCr444 format, and high dynamic range imaging (HDR).

It should be noted that the audio and video data may also be outputted by the transmitting device to a display device 0 connected to the transmitting device via the first HDMI to realize the display of a video consist of the audio and video data.

At block 102, the audio and video data are processed by the transmitting device into a first protocol data stream.

According to an embodiment of this disclosure, the processing of audio and video data into a first protocol data stream by the transmitting device may include, but is not limited to, the following processing methods.

Processing Method 1

The transmitting device encapsulates the audio and video data directly into the first protocol data stream through a transition-minimized differential signaling (TMDS) protocol. Where the first protocol data stream may include, but is not limited to, a protocol data stream in the form of a TMDS packet.

Processing Method 2

The transmitting device encodes the audio and video data with a compression scheme to obtain first code stream data, and encapsulates the first code stream data into the first protocol data stream through the TMDS protocol, where the first code stream data may include, but is not limited to, the code stream data obtained by performing, with a display stream compression (DSC) scheme, compressing the audio and video data.

It should be noted that the transmitting device encodes the audio and video data with the compression scheme to obtain the first code stream data, and encapsulates the first code stream data into the first protocol data stream through the above-mentioned preset protocol, where the first code stream data according to the embodiment of this disclosure is the code stream data obtained by performing compressing the audio and video data with the compression scheme.

In the processing method 2, the transmitting device encodes the audio and video data with the compression scheme to obtain the first code stream data, and encapsulates the first code stream data into the first protocol data stream through the TMDS protocol, which may specifically include, but is not limited to, the following ways.

Way 1

The transmitting device encodes the audio and video data with the DSC scheme to obtain the first code stream data.

Way 2

The transmitting device encodes the audio and video data with a color space converter (CSC) to obtain the first code stream data with a YUV420 format.

Way 3

The transmitting device encodes the audio and video data with JPEG2000 compression scheme to obtain the first code stream data.

The following describes video as an example of the audio and video data, and the transmitting device encodes the video with the DSC scheme to obtain the first code stream data, which may include, but is not limited to, the following steps.

In step 1, the transmitting device divides each frame of the video into a number of non-overlapping square strips as independent coding units, where the coding is performed in a line-scan manner and can be processed in groups of A×1 pixels consisting of A connected pixels, optionally, A can be 3, 4 or 5, without limitation here.

In step 2, the transmitting device predicts the current pixel with the DSC scheme based on a differential pulse code modulation (DPCM) method within the frame, quantizes and reconstructs the pixel by using a simple integer power of 2 quantization for the predicted residual value, and entropy codes the quantized residual signal (e.g., variable length coding, VLC), where the entropy coding operates on a 3×1 pixel group, and each component of the 3×1 pixel group can produce an entropy coded sub-stream, and these sub-streams (i.e., each word stream can be a compressed data stream formed for each component) are outputted by packing and self-streaming multiplexing.

It should be noted that the DSC scheme may support, but is not limited to, the following prediction models: modified median adaptive prediction (MMAP), block prediction (BP), and mid-point prediction (MPP).

It should be noted that the transmission bandwidth required for transmitting, by the transmitting device, audio and video data with 4K resolution and 60 frames per second is about 18 Gbit/s. If the audio and video data is compressed twice by the transmitting device, the transmission bandwidth required for transmitting the audio and video data can be half of the 18 Gbit/s (9 Gbit/s), thus the transmission bandwidth can be greatly reduced by compressing the transmission data with the DSC scheme, and accordingly, the transmission cost is reduced.

According to the embodiment of this disclosure, the transmitting device may also encode the audio and video data with the CSC to obtain the first code stream data with the YUV420 format.

When the format of the multimedia data is the YUV444 format, taking the data of 8 pixels as an example, if the data format of each pixel is the YUV444 format, the data of 8 pixels with the YUV444 format can be expressed as follows.

YUV, YUV, YUV, YUV, YUV, YUV, YUV, YUV.

At this point, the memory space occupied by the data of 8 pixels with the YUV444 format can be 8*8*3 bit=192 bit, where each pixel of 8 pixels includes Y, U, V three components, and each component of the three components can be expressed by 8 bit. In other words, the data with the YUV444 format indicates that each Y component corresponds to a set of UV components.

If the data format of each pixel is a YUV422 format, the data of 8 pixels with the YUV422 format can be expressed as follows.

YUV, Y, YUV, Y, YUV, Y, YUV, Y.

At this point, the memory space occupied by the data of 8 pixels with the YUV422 format can be 8*4*4 bit=128 bit. In other words, the data with the YUV422 format indicates that every two Y components correspond to (share) a set of UV components.

If the data in each pixel is a YUV420 format, the data in 8 pixels with the YUV420 format can be expressed as follows:

Y, YUV, Y, Y, Y, YUV, Y, Y.

At this point, the memory space occupied by the data of 8 pixels with the YUV420 format can be 8*2*6 bit=96 bit. It should be noted that the data with the YUV420 format indicates that every four Y components can correspond to (share) a set of UV components.

It should be noted that, for example, data with the YUV444 format is processed to obtain data with the YUV420 format for 8 pixels. The storage space occupied by data with the YUV420 format for 8 pixels is one-half (96/192) of the storage space occupied by the data with the YUV444 format before.

According to the embodiment of the disclosure, the transmitting device can encode the above audio and video data according to any of the above ways to obtain the first code stream data, in addition to combining the CSC with the DSC scheme to encode the audio and video data to obtain the first code stream data, alternatively, in addition, combining the CSC with the JPEG2000 compression scheme to encode the audio and video data to obtain the first code stream data.

Specifically, the transmitting device can encode the audio and video data with the CSC to obtain first data, and encode the first data with the DSC to obtain the first code stream data.

The transmitting device encodes the audio and video data with the CSC to obtain the first data, and encodes the first data with JPEG2000 compression scheme to obtain the first code stream data.

More specifically, the transmitting device encodes the audio and video data with the CSC to obtain the first data, and encodes the first data with the DSC scheme to obtain the first code stream data, which may include the follows.

Suppose the format of audio and video data is the YUV444 format. Then firstly, the YUV444 format is converted into data with the YUV422 format with the CSC. Then, the converted data with the YUV422 format is further compressed, by the transmitting device, with the DSC scheme to obtain the stream data.

It should be noted that the transmitting device may also encapsulate the audio and video data directly into the first protocol data stream through the preset protocol, where the preset protocol may include, but is not limited to, a UDP protocol, a TCP protocol, or a custom protocol.

It should be noted that the transmitting device encapsulates the first code stream data into a first protocol data stream through the preset protocol.

At block 103, the first protocol data stream is transmitted by the transmitting device via a first transmission medium interface.

According to the embodiment of the disclosure, the first transmission medium interface may include, but is not limited to, a first network port or a second optical port.

The first protocol data stream is transmitted by the transmitting device via the first transmission medium interface, which may include, but is not limited to, the following ways.

Way 1

The transmitting device can transmit the first protocol data stream to a receiving device via a first optical port of the transmitting device.

According to the embodiment of the disclosure, the first optical port of the transmitting device may be a fiber optic interface.

Specifically, the transmitting device can transmit the first protocol data stream to the receiving device via the fiber optic interface of the transmitting device and the fiber optic.

Optionally, the length of the optical fiber may be 70 m, which is not limited in the embodiment of this disclosure.

Way 2

The transmitting device transmits the first protocol data stream to the receiving device via a first network port of the transmitting device.

According to the embodiment of this disclosure, the first network port of the transmitting device may be a network cable interface for use between the network card and the network.

Specifically, the transmitting device may transmit the first protocol data stream to the receiving device via the network cable interface (e.g., RJ-45) of the transmitting device and may transmit the first protocol data stream and the network cable (e.g., Category 5, Super Category 5, Category 6, or Category 7 cable). Optionally, the length of the network cable may be 70 m, which is not limited in the embodiment of the present disclosure.

The embodiment in this disclosure provides a transmitting method for audio and video data in a long-distance transmission. The audio and video data is obtained by the transmitting device via the first HDMI. The audio and video data is processed by the transmitting device into a first protocol data stream. The first protocol data stream is transmitted by the transmitting device via the first transmission medium interface. By adopting the embodiment of the disclosure, the extended transmission of audio and video data can be realized, and by processing audio and video data, the transmission cost can be reduced, the construction time can be reduced, and the user experience is high.

Figure 2:
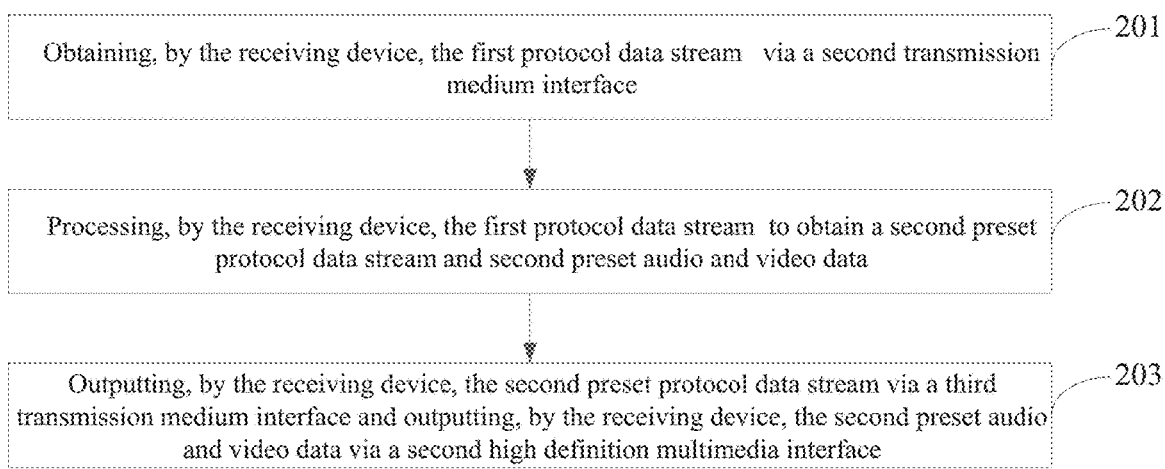
FIG. 2 is a schematic structural diagram of a receiving method for audio and video data in the long-distance transmission according to the disclosure.

FIG. 2 is a schematic flow diagram of a receiving method for audio and video data in a long-distance transmission according to the present disclosure. As shown in FIG. 2, the receiving method may include at least the following steps.

At block 201, the first protocol data stream is obtained by the receiving device via a second transmission medium interface.

According to the embodiment of the disclosure, the second transmission medium interface may include, but is not limited to, a second network port or a second optical port.

The receiving device obtains the first protocol data stream via the second transmission medium interface, which may specifically include, but is not limited to, the following ways.

Way 1

The receiving device obtains the first protocol data stream from the transmitting device via the second optical port of the receiving device.

According to the embodiment of the disclosure, the second optical port of the receiving device may be an optical fiber interface.

Specifically, the receiving device may obtain the first protocol data stream from the transmitting device via the fiber optic interface of the receiving device and the fiber optic.

Way 2

The receiving device obtains the first protocol data stream from the transmitting device via the second network port of the receiving device, which can be a network cable interface for use between the network card and the network.

Specifically, the receiving device obtains the first protocol data stream from the transmitting device via a network cable interface (e.g., RJ-45) of the receiving device and a network cable (e.g., Category 5, Super Category 5, Category 6, or Category 7 cable).

At block 202, the first protocol data stream is processed by the receiving device to obtain the second preset protocol data stream and second preset audio and video data.

According to an embodiment of the disclosure, the receiving device processes the first protocol data stream to obtain the second preset protocol data stream and the second preset audio and video data, which may include, but is not limited to, the following ways.

Way 1

The receiving device performs a decapsulation operation of the first protocol data stream through the TMDS protocol to obtain the second preset audio and video data.

The receiving device generates the second preset protocol data stream based on the second preset audio and video data and through the TMDS protocol.

It should be noted that when the transmitting device encapsulates the audio and video data obtained from the video source device into the first protocol data stream through the TMDS protocol, the receiving device performs a decapsulation operation of the first protocol data stream through the TMDS protocol to obtain the second preset audio and video data. It is understood that when the audio and video data obtained, by the transmitting device, from the video source device is encapsulated into the first protocol data stream through the preset protocol, the first protocol data stream is decapsulated, by the receiving device, through the preset protocol to obtain the second preset audio and video data, where the preset protocol, may include but not limited to, a UDP protocol, a TCP protocol or a custom protocol.

It should be noted that the second preset audio and video data, may include, but is not limited to, audio and video data such as sound, images, etc.

Way 2

The receiving device performs a decapsulation operation of the first protocol data stream through the TMDS protocol to obtain the second preset code stream data.

The receiving device decodes the second preset code stream data with a decompression scheme to obtain the second preset audio and video data, where the second preset code stream data may be the code stream data obtained by decapsulating the first protocol data stream through the TMDS protocol.

The receiving device generates the second preset protocol data stream based on the second preset audio and video data and the TMDS protocol.

It should be noted that when the transmitting device encodes the audio and video data obtained from the video source device with the compression scheme to obtain the first code stream data, and encapsulates the first code stream data into the first protocol data stream through the TMDS protocol, then the receiving device performs the decapsulation operation of the first protocol data stream through the TMDS protocol to obtain the second preset code stream data, and performs the decoding operation of the second preset code stream data with the decompression scheme to obtain the second preset audio and video data.

It should be understood that when the transmitting device encodes the audio and video data obtained from the video source device with the compression scheme to obtain the first code stream data, and encapsulates the first code stream data into the first protocol data stream through the preset protocol, the receiving device performs the decapsulation operation of the first protocol data stream through the above preset protocol to obtain the second preset code stream data, and performs the decoding operation of the second preset code stream data with the decompression scheme to obtain the second preset audio and video data.

It should be noted that when the transmitting device encodes the audio and video data obtained from the video source device with the DSC to obtain the first code stream data, and encapsulates the first code stream data into the first protocol data stream through the TMDS protocol, the receiving device decapsulates the first protocol data stream through the TMDS protocol to obtain the second preset code stream data, and decodes the second preset code stream data with the DSC to obtain the second preset audio and video data.

Specifically, when the transmitting device encodes the audio and video data obtained from the video source device with the CSC to obtain the first code stream data, and encapsulates the first code stream data into the first protocol data stream through the TMDS protocol, the receiving device decapsulates the first protocol data stream through the TMDS protocol to obtain the second preset code stream data, and decodes the second preset code stream data with the CSC to obtain the second preset audio and video data.

Specifically, when the transmitting device encodes the audio and video data obtained from the video source device with JPEG2000 compression scheme to obtain the first stream data, and encapsulates the first stream data into the first protocol data stream through the TMDS protocol, the receiving device decapsulates the first protocol data stream through the TMDS protocol to obtain the second preset stream data, and decodes the second preset stream data with JPEG2000 decompression scheme to obtain the second preset audio and video data.

Specifically, when the transmitting device encodes the audio and video data with the CSC to obtain the first data, encodes the first data with the DSC to obtain the first code stream data, and encapsulates the first code stream data into the first protocol data stream through the TMDS protocol, the receiving device performs the decapsulation operation on the first protocol data stream through the TMDS protocol to obtain the second preset code stream data, performs decoding operation on the second preset code stream data with the DSC to obtain the second preset data, and performs decoding operation on the second preset data with the CSC to obtain the second preset audio and video data.

Specifically, when the transmitting device encodes the audio and video data with the CSC to obtain the first data, encodes the first data with the JPEG2000 compression scheme to obtain the first code stream data, and encapsulates the first code stream data into the first protocol data stream through the TMDS protocol, the receiving device performs a decapsulation operation on the first protocol data stream through the TMDS protocol to obtain the second preset code stream data, decodes the second preset code stream data with JPEG2000 decompression scheme to obtain the second preset data, and decodes the second preset data with the CSC to obtain the second preset audio and video data.

Way 3

The receiving device replicates the first protocol data stream to obtain the second preset protocol data stream.

The receiving device performs the decapsulation operation of the first protocol data stream through the TMDS protocol to obtain the second preset audio and video data.

It should be noted that when the transmitting device encapsulates the audio and video data obtained from the video source device into the first protocol data stream through the TMDS protocol, the receiving device performs a decapsulation operation of the first protocol data stream through the TMDS protocol to obtain the second preset audio and video data. It should be understood that when the transmitting device encapsulates the audio and video data obtained from the video source device into the first protocol data stream through the preset protocol, the receiving device performs the decapsulation operation of the first protocol data stream through the preset protocol to obtain the second preset audio and video data.

Way 4

The receiving device replicates the first protocol data stream to obtain the second preset protocol data stream.

The receiving device performs a decapsulation operation of the first protocol data stream through the TMDS protocol to obtain the second preset code stream data.

The receiving device decodes the second preset stream data with the decompression scheme to obtain the second preset audio and video data.

It should be noted that when the transmitting device encodes the audio and video data obtained from the video source device with the compression scheme to obtain the first code stream data, and encapsulates the first code stream data into the first protocol data stream through the TMDS protocol, the receiving device performs the decapsulation operation of the first protocol data stream through the TMDS protocol to obtain the second preset code stream data, and performs the decoding operation of the second preset code stream data with the decompression scheme to obtain the second preset audio and video data. Please refer to the aforementioned way 2 for the specific elaboration, which will not be repeated here.

It should be understood that when the transmitting device encodes the audio and video data obtained from the video source device with the compression scheme to obtain the first code stream data, and encapsulates the first code stream data into the first protocol data stream through the preset protocol, the receiving device may also perform the decapsulation operation of the first protocol data stream through the preset protocol to obtain the second preset code stream data, and performs the decoding operation of the second preset code stream data with the decompression scheme to obtain the second preset audio and video data.

At block 203, the second preset protocol data stream is outputted by the receiving device via a third transmission medium interface and the second preset audio and video data via a second high definition multimedia interface (HDMI).

Specifically, the receiving device outputs the second preset protocol data stream via the third transmission medium interface and outputs the second preset audio and video data via the second HDMI, which may include, but is not limited to, the following process.

The receiving device outputs the second preset protocol data stream to other receiving devices via the third transmission medium interface to achieve extended transmission of the second preset protocol stream data, and outputs the second preset audio and video data to the display device via the second HDMI to display or play the second preset audio and video data.

It should be understood that the third transmission medium interface may include, but is not limited to, a third network port or a third optical port.

The receiving device outputs the second preset protocol data stream to other receiving devices via the third transmission medium interface, which may include, but is not limited to, the following ways.

Way 1

The receiving device outputs the second preset protocol data stream to other receiving device via the third optical port of the receiving device.

According to an embodiment of the disclosure, the third optical port of the receiving device may be an optical fiber interface.

Specifically, the receiving device may transmit the second preset protocol data stream to other receiving devices via the fiber optic interface and fiber of the receiving device.

Way 2

The receiving device outputs the second preset protocol data stream to other receiving devices via the third network port of the receiving device.

According to an embodiment of the disclosure, the third network port of the receiving device may be a network cable interface for use between the network card and the network.

Specifically, the receiving device outputs the second preset protocol data stream to another receiving device via the network cable interface and network cable of the receiving device.

According to an embodiment of the disclosure, the receiving device may include, but is not limited to, a first receiving device and a second receiving device.

The receiving device outputs the second preset protocol data stream via the third transmission medium interface and the second preset audio and video data via the second HDMI, which may include, but is not limited to, the following process.

The first receiving device outputs the second preset protocol data stream to the second receiving device via the third transmission medium interface of the first receiving device, and outputs the second preset audio and video data to the display device via the second HDMI of the first receiving device.

Figure 3:
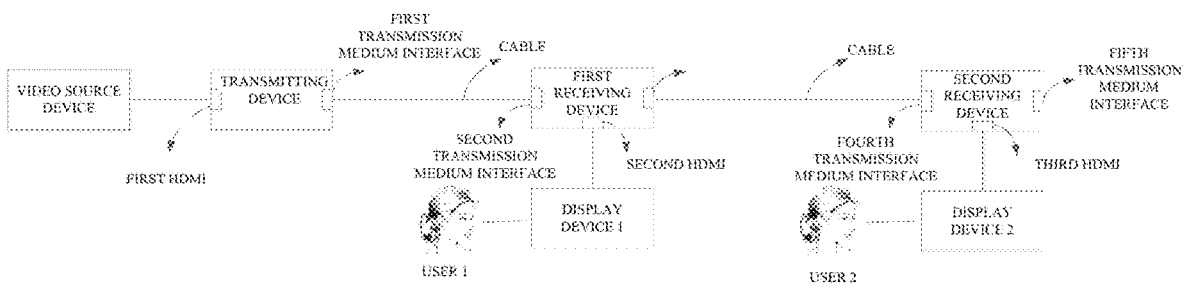
FIG. 3 is a schematic structural diagram of a cascade scenario according to the disclosure.

To illustrate the above scenario in more detail, the embodiments of the present disclosure provide a schematic diagram of a scenario for transmitting audio and video data. FIG. 3 exemplarily illustrates a schematic diagram of a scenario for transmitting audio and video data, which may include, but is not limited to, the following devices, a video source device, a transmitting device, a first receiving device, a second receiving device, a display device 1, and a display device 2, as shown in FIG. 3.

Specifically, in this scenario, the transmitting device may obtain audio and video data from a video source device such as a DVD, set-top box or camera via the first HDMI, processes the audio and video data to obtain the first protocol data stream, and transmits the first protocol data stream to the first receiving device via the first network interface and a network cable. The first receiving device receives the first protocol data stream transmitted by the transmitting device via the second network interface, processes the received first protocol data stream to obtain the second preset audio and video data and the second preset protocol data stream. The first receiving device can, on the one hand, output the second preset audio and video data to a display device 1 via the second HDMI to realize the display of the audio and video corresponding to the second preset audio and video data, and the first receiving device on the other hand may also output the second preset protocol data stream to the second receiving device via the third network interface. The second receiving device receives the second preset protocol data stream transmitted by the first receiving device via a fourth transmission medium interface.

It should be noted that the second receiving device can further process the second preset protocol data stream into the third preset audio and video data and the third preset protocol data stream, can output the third preset audio and video data to a display device 2 via a third HDMI on the one hand, and can also transmit the third preset protocol data stream to other receiving devices via a fifth transmission medium interface on the other hand. In summary, this disclosure can achieve that only one transmitting device is needed for the purpose of displaying the same audio/video data or audio/video content with the display device connected to each of the multiple receiving devices separately, thus the disclosure can reduce the transmission cost.

It should be noted that the fourth transmission medium interface may include, but is not limited to, a network cable interface or a fiber optic interface.

It should be understood that when the third transmission medium interface is a network cable interface, the fourth transmission medium is the same as the network cable interface, and when the third transmission medium interface is a fiber optic interface, the fourth transmission medium is the same as the fiber optic interface.

It should be understood that the fifth transmission medium interface may include, but is not limited to, a fiber optic interface or a network cable interface.

By adopting the present embodiment, the receiving device obtains the first protocol data stream via the second transmission medium interface. The receiving device processes the first protocol data stream to obtain the second preset protocol data stream and the second preset audio and video data. The receiving device outputs the second preset protocol data stream via the third transmission medium interface. The second preset audio and video data is outputted via the second HDMI. With this disclosure, stable transmission of audio and video data is realized, and the transmission cost and wiring cost can be reduced through the processing of audio and video data. On the one hand, the wiring cost can be reduced, and on the other hand, the construction time is reduced, and the user experience is high.

FIG. 3 is used only to explain an embodiment of the disclosure and should not limit the disclosure.

It is understood that the relevant definitions and descriptions not provided in the embodiment shown in FIG. 2 can be referred to the embodiment of FIG. 1 and will not be repeated here.

The present disclosure provides a transmitting device for audio and video data in a long-distance transmission that can be used to implement the method described in the embodiment of FIG. 1. The transmitting device for audio and video data shown in FIG. 4 can be configured to perform what is described in the embodiment of FIG. 1.

Figure 4:
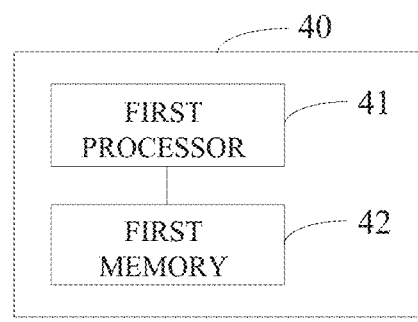
FIG. 4 is a schematic structural diagram of a transmitting device for audio and video data in the long-distance transmission according to the disclosure.

As shown in FIG. 4, the transmitting device 40 may include, but is not limited to, a first memory 42 and a first processor 41 coupled to the first memory 42.

The first memory 42 is specifically configured to store application instructions.

The first processor 41 is specifically configured to call the application instructions process audio and video data via the first high definition multimedia interface (HDMI) of the transmitting device 40 into a first protocol data stream.

The first processor 41 configured to process the audio and video data into the first protocol data stream is configured to:

encapsulate the audio and video data into the first protocol data stream through a transition-minimized differential signaling (TMDS) protocol.

Or the first processor 41 configured to process the audio and video data into the first protocol data stream is configured to encode the audio and video data with a compression scheme to obtain first code stream data, and encapsulate the first code stream data into the first protocol data stream through the TMDS protocol.

The first processor 41 configured to process the audio and video data into the first protocol data stream is configured to:

encode the audio and video data with a display stream compression (DSC) scheme to obtain the first code stream data;

encode the audio and video data with a color space converter (CSC) to obtain the first code stream data with a YUV420 format;

encode the audio and video data with a JPEG2000 compression scheme to obtain the first code stream data;

encode the audio and video data with the CSC to obtain first data, encode the first data with the DSC scheme to obtain the first code stream data; or encode the audio and video data with the CSC to obtain the first data, and encode the first data with the JPEG2000 compression scheme to obtain the first code stream data.

It should be noted that the transmitting device 40 further comprises a first HDMI, where the first HDMI is configured to obtain audio and video data via three TMDS data channels of the first HDMI, and the first HDMI is a HDMI interface of the transmitting device 40 to obtain audio and video data from a video source device connected to the transmitting device 40.

It should be noted that the transmitting device 40 further comprises a first transmission medium interface, where the first optical port is configured to transmit the first protocol data stream to a receiving device when the first transmission medium interface is a first optical port, and the first optical port is an optical fiber interface for transmitting the first protocol data stream.

Or the first network port is configured to transmit the first protocol data stream to the receiving device when the first transmission medium interface is a first network port; wherein the first network port being a network cable interface for transmitting the first protocol data stream.

It should be understood that transmitting device 40 is only one example provided in embodiments of the present disclosure, and that transmitting device 40 may have more or fewer components than those shown, may combine two or more components, or may have different configurations of components implemented.

It is understood that the specific implementation of the functional components included in the transmitting device 40 of FIG. 4 can be referred to the embodiment of FIG. 1 and will not be repeated here.

The present disclosure provides a receiving device for audio and video data in a long-distance transmission that can be configured to implement the method described in the embodiment of FIG. 2. The receiving device for audio and video data shown in FIG. 5 may be configured to perform what is described in the embodiment of FIG. 2.

Figure 5:
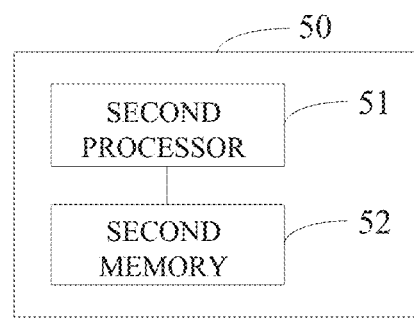
FIG. 5 is a schematic structural diagram of a receiving device for audio and video data in the long-distance transmission according to the disclosure.

As shown in FIG. 5, the receiving device 50 may include, but is not limited to, a second memory 52 and a second processor 51 coupled to the second memory 52.

The second memory 52 is specifically configured to store application instructions.

The second processor 51 is specifically configured to call the application instructions to:

process a first protocol data stream via a second transmission medium interface to obtain a second preset protocol data stream, and second preset audio and video data; where the second preset protocol data stream is outputted via a third transmission medium interface, and the second preset audio and video data is outputted via a second high definition multimedia interface (HDMI).

It is noted that the receiving device 50 includes a first receiving device and a second receiving device, where the first receiving device is configured to output the second preset protocol data stream to the second receiving device via the third transmission medium interface of the first receiving device, and output the second preset audio and video data to a display device via the second HDMI of the first receiving device.

It is noted that the receiving device 50 configured to process the first protocol data stream to obtain the second preset protocol data stream and the second preset audio and video data is configured to perform a decapsulation operation of the first protocol data stream through a transition-minimized differential signaling (TMDS) protocol to obtain the second preset audio and video data, and generate the second preset protocol data stream based on the second preset audio and video data and through the TMDS protocol.

It is noted that the receiving device 50 configured to process the first protocol data stream to obtain the second preset protocol data stream and the second preset audio and video data is configured to perform a decapsulation operation of the first protocol data stream through the TMDS protocol to obtain a second preset code stream data, decode the second preset code stream data by a decompression scheme to obtain the second preset audio and video data, and generate the second preset protocol data stream based on the second preset audio and video data and through the TMDS protocol.

It is noted that the receiving device 50 configured to process the first protocol data stream to obtain the second preset protocol data stream and the second preset audio and video data is configured to make a copy of the first protocol data stream to obtain the second preset protocol data stream, and perform the decapsulation operation of the first protocol data stream through the TMDS protocol to obtain the second preset audio and video data.

It is noted that the receiving device 50 configured to process the first protocol data stream to obtain the second preset protocol data stream and the second preset audio and video data is configured to make a copy of the first protocol data stream to obtain the second preset protocol data stream, perform a decapsulation operation of the first protocol data stream through the TMDS protocol to obtain the second preset code stream data, and perform a decoding operation of the second preset code stream data with the decompression scheme to obtain the second preset audio and video data.

It is noted that the receiving device 50 configured to obtain the first protocol data stream via the second transmission medium interface is configured to obtain the first protocol data stream from the transmitting device via a second optical port of the receiving device, where the second optical port is an optical fiber interface for obtaining the first protocol data stream.

Or the receiving device 50 configured to obtain the first protocol data stream via the second transmission medium interface is configured to obtain the first protocol data stream from the transmitting device via a second network port of the receiving device; where the second network port is a network cable interface for obtaining the first protocol data stream.

It is noted that the receiving device 50 configured to output the second preset protocol data stream via the third transmission medium interface is configured to output the second preset protocol data stream via a third optical port, the third optical port being an optical fiber interface for outputting the second preset protocol data stream.

Or the receiving device 50 configured to output the second preset protocol data stream via the third transmission medium interface is configured to output the second preset protocol data stream via a third network port, the third network port being a network cable interface for outputting the second preset protocol data stream.

It should be understood that receiving device 50 is only one example provided in embodiments of the present disclosure, and that receiving device 50 may have more or fewer components than illustrated, may combine two or more components, or may have different configurations of components implemented.

It is understood that the specific implementation of the functional components included in the receiving device 50 of FIG. 5 can be referred to the embodiment of FIG. 2 and will not be repeated here.

A computer-readable storage medium is provided according to at least one implementation of the disclosure. The computer-readable storage medium stores a computer program, which is executed by a processor.

The computer-readable storage medium may be an internal storage unit of the device described in any of the foregoing implementations, such as a hard disk or a memory of the device. The computer-readable storage medium may also be an external storage device of the equipment or the like. Further, the computer-readable storage medium may also include both an internal storage unit of the device and an external storage device. The computer-readable storage medium is configured to store computer programs and other programs and data required by the equipment. The computer-readable storage medium can also be configured to temporarily store data that has been or will be output.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection through some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A transmitting method for audio and video data in long-distance transmission, comprising:
   obtaining, by the transmitting device, audio and video data via a first high definition multimedia interface (HDMI);
   processing, by the transmitting device, the audio and video data into a first protocol data stream; and
   transmitting, by the transmitting device, the first protocol data stream via a first transmission medium interface; wherein
   the audio and video data include the following features: the data format being a YUV444 or YCbCr444 format, and high dynamic range imaging (HDR); and
   processing, by the transmitting device, the audio and video data into the first protocol data stream comprises:
   encapsulating, by the transmitting device, the audio and video data into the first protocol data stream through transition-minimized differential signaling (TMDS) protocol.

2. The transmitting method according to claim 1, wherein encoding, by the transmitting device, the audio and video data with the compression scheme to obtain the first code stream data comprises:
   encoding, by the transmitting device, the audio and video data with a display stream compression (DSC) scheme to obtain the first code stream data;
   encoding, by the transmitting device, the audio and video data with a color space converter (CSC) to obtain the first code stream data with a YUV420 format;
   encoding, by the transmitting device, the audio and video data with a JPEG2000 compression scheme to obtain the first code stream data;
   encoding, by the transmitting device, the audio and video data with the CSC to obtain first data, and encoding, by the transmitting device, the first data with the DSC to obtain the first code stream data; or
   encoding, by the transmitting device, the audio and video data with the CSC to obtain the first data, and encoding, by the transmitting device, the first data with the JPEG2000 compression scheme to obtain the first code stream data.

3. The transmitting method according to claim 1, wherein obtaining the audio and video data via the first HDMI comprises:
   obtaining the audio and video data via three TMDS data channels of the first HDMI, wherein the first HDMI is a HDMI of the transmitting device for obtaining the audio and video data from a video source device connected to the transmitting device.

4. The transmitting method according to claim 1, wherein transmitting, by the transmitting device, the first protocol data stream via the first transmission medium interface comprises:
   transmitting, by the transmitting device, the first protocol data stream to a receiving device via a first optical port of the transmitting device, the first optical port being an optical fiber interface for transmitting the first protocol data stream; or
   transmitting, by the transmitting device, the first protocol data stream to the receiving device via a first network port of the transmitting device, the first network port being a network cable interface for transmitting the first protocol data stream.

5. A receiving method for audio and video data in a long-distance transmission, comprising:
   obtaining, by the receiving device, a first protocol data stream via a second transmission medium interface;
   processing, by the receiving device, the first protocol data stream to obtain a second preset protocol data stream and second preset audio and video data; and
   outputting, by the receiving device, the second preset protocol data stream via a third transmission medium interface and outputting, by the receiving device, the second preset audio and video data via a second high definition multimedia interface (HDMI);
   the receiving device comprises a first receiving device and a second receiving device; wherein
   outputting, by the receiving device, the second preset protocol data stream via the third transmission medium interface and outputting, by the receiving device, the second preset audio and video data via the second HDMI, comprises:
   outputting, by the first receiving device, the second preset protocol data stream to the second receiving device via the third transmission medium interface of the first receiving device and outputting, by the first receiving device, the second preset audio and video data to a display device via the second HDMI of the first receiving device;
   outputting, by the receiving device, the second preset protocol data stream via the third transmission medium interface and outputting, by the receiving device, the second preset audio and video data via the second HDMI, further comprises:
   receiving, by the second receiving device, the second preset protocol data stream transmitted by the first receiving device via a fourth transmission medium interface;

processing, by the second receiving device, the second preset protocol data stream into the third preset audio and video data and the third preset protocol data stream;
outputting the third preset audio and video data to a display device via a third HDMI, and
transmitting the third preset protocol data stream to other receiving devices via a fifth transmission medium interface; wherein
the fourth transmission medium interface comprises a network cable interface or a fiber optic interface, when the third transmission medium interface is a network cable interface, the fourth transmission medium is the same as the network cable, and when the third transmission medium interface is a fiber optic interface, the fourth transmission medium is the same as the fiber optic interface, and the fifth transmission medium includes a fiber optic interface or a network cable interface.

6. The receiving method according to claim 5, wherein
processing, by the receiving device, the first protocol data stream to obtain the second preset protocol data stream and the second preset audio and video data comprises:
performing, by the receiving device, a decapsulation operation of the first protocol data stream through a transition-minimized differential signaling (TMDS) protocol to obtain the second preset audio and video data;
generating, by the receiving device, the second preset protocol data stream based on the second preset audio and video data and through the TMDS protocol.

7. The receiving method according to claim 5, wherein
processing, by the receiving device, the first protocol data stream to obtain the second preset protocol data stream and the second preset audio and video data, comprises:
performing, by the receiving device, a decapsulation operation of the first protocol data stream through the TMDS protocol to obtain the second preset code stream data;
decoding, by the receiving device, the second preset code stream data by a decompression scheme to obtain the second preset audio and video data; and
generating, by the receiving device, the second preset protocol data stream based on the second preset audio and video data and through the TMDS protocol.

8. The receiving method according to claim 5, wherein
processing, by the receiving device, the first protocol data stream to obtain the second preset protocol data stream and the second preset audio and video data comprises:
making, by the receiving device, a copy of the first protocol data stream to obtain the second preset protocol data stream;
performing, by the receiving device, the decapsulation operation of the first protocol data stream through the TMDS protocol to obtain the second preset audio and video data.

9. The receiving method according to claim 5, wherein
processing, by the receiving device, the first protocol data stream to obtain the second preset protocol data stream and the second preset audio and video data, comprises:
making, by the receiving device, a copy of the first protocol data stream to obtain the second preset protocol data stream;
performing, by the receiving device, a decapsulation operation of the first protocol data stream through the TMDS protocol to obtain second preset code stream data; and
performing, by the receiving device, a decoding operation of the second preset code stream data with the decompression scheme to obtain the second preset audio and video data.

10. The receiving method according to claim 5, wherein
obtaining, by the receiving device, the first protocol data stream via the second transmission medium interface comprises:
obtaining, by the receiving device, the first protocol data stream from the transmitting device via a second optical port of the receiving device; wherein the second optical port is an optical fiber interface for obtaining the first protocol data stream;
or
obtaining, by the receiving device, the first protocol data stream from the transmitting device via a second network port of the receiving device; wherein the second network port is a network cable interface for obtaining the first protocol data stream.

11. The receiving method according to claim 5, wherein
outputting, by the receiving device, the second preset protocol data stream via the third transmission medium interface comprises:
outputting, by the receiving device, the second preset protocol data stream via a third optical port, the third optical port being an optical fiber interface for outputting the second preset protocol data stream; or
outputting, by the receiving device, the second preset protocol data stream via a third network port, the third network port being a network cable interface for outputting the second preset protocol data stream.

12. A transmitting device for audio and video data in long-distance transmission, comprising:
a first memory configured to store first application instructions; and
a first processor coupled to the first memory and configured to call a first application instructions to process audio and video data via the first high definition multimedia interface (HDMI) into a first protocol data stream; wherein
the audio and video data include the following features: the data format being a YUV444 or YCbCr444 format, and high dynamic range imaging (HDR);
the first processor configured to process the audio and video data into the first protocol data stream is configured to:
encapsulate the audio and video data into the first protocol data stream through transition-minimized differential signaling (TMDS) protocol.

13. The transmitting device according to claim 12, wherein,
the first processor configured to process the audio and video data into the first protocol data stream is configured to:
encode the audio and video data with a display stream compression (DSC) to obtain the first code stream data;
encode the audio and video data with a color space converter (CSC) to obtain the first code stream data with a YUV420 format;
encode the audio and video data with a JPEG2000 compression scheme to obtain the first code stream data;
encode the audio and video data with the CSC to obtain first data, encode the first data with the DSC to obtain the first code stream data; or encode the audio and video data with the CSC to obtain the first data, and encode the first data with the JPEG2000 compression scheme to obtain the first code stream data.

14. The transmitting device according to claim 12, wherein
the transmitting device further comprises a first HDMI; wherein the first HDMI is configured to obtain audio and video data via three TMDS data channels of the first HDMI, and the first HDMI is a HDMI interface of the transmitting device to obtain audio and video data from a video source device connected to the transmitting device.

15. The transmitting device according to claim 12, wherein
the transmitting device further comprises a first transmission medium interface; wherein:
a first optical port is configured to transmit the first protocol data stream to a receiving device when the first transmission medium interface is the first optical port, and the first optical port is an optical fiber interface for transmitting the first protocol data stream; or
a first network port is configured to transmit the first protocol data stream to the receiving device when the first transmission medium interface is the first network port, and the first network port is a network cable interface for transmitting the first protocol data stream.

16. A receiving device for audio and video data in a long-distance transmission, comprising:
a second memory configured to store second application instructions; and
a second processor coupled to the second memory configured to call the second application instructions to:
process a first protocol data stream via a second transmission medium interface to obtain a second preset protocol data stream, and second preset audio and video data; wherein the second preset protocol data stream is outputted via a third transmission medium interface, and the second preset audio and video data is outputted via a second high definition multimedia interface (HDMI);
the receiving device comprises a first receiving device and a second receiving device; wherein
the first receiving device is configured to:
output the second preset protocol data stream to the second receiving device via the third transmission medium interface of the first receiving device, and output the second preset audio and video data to a display device via the second HDMI of the first receiving device;
the second receiving device is configured to:
receive the second preset protocol data stream transmitted by the first receiving device via a fourth transmission medium interface, process the second preset protocol data stream into the third preset audio and video data and the third preset protocol data stream,
output the third preset audio and video data to a display device via a third HDMI, and
transmit the third preset protocol data stream to other receiving devices via a fifth transmission medium interface; wherein
the fourth transmission medium interface comprises a network cable interface or a fiber optic interface, when the third transmission medium interface is a network cable interface, the fourth transmission medium is the same as the network cable, and when the third transmission medium interface is a fiber optic interface, the fourth transmission medium is the same as the fiber optic interface, and the fifth transmission medium includes a fiber optic interface or a network cable interface.

* * * * *